US00RE50216E

(19) United States
(12) Reissued Patent
O'Connell et al.

(10) Patent Number: US RE50,216 E
(45) Date of Reissued Patent: Nov. 26, 2024

(54) CEILING FAN MOTOR HOUSING AND LIGHT KIT COMBINATION

(71) Applicant: Hunter Fan Company, Memphis, TN (US)

(72) Inventors: Patrick R. O'Connell, Germantown, TN (US); Christine Marie Holmes Bradley, Memphis, TN (US)

(73) Assignee: Hunter Fan Company, Memphis, TN (US)

(21) Appl. No.: 29/862,193

(22) Filed: Dec. 7, 2022

Related U.S. Patent Documents

Reissue of:
(64) Patent No.: Des. 904,597
Issued: Dec. 8, 2020
Appl. No.: 29/713,784
Filed: Nov. 19, 2019

U.S. Applications:
(62) Division of application No. 29/642,362, filed on Mar. 29, 2018, now Pat. No. Des. 888,221.

(51) LOC (14) Cl. ..... 23-03
(52) U.S. Cl.
USPC ..... D23/411; D26/59
(58) Field of Classification Search
USPC ..... D23/370, 377, 379, 385, 411, 413; D26/59, 85, 86, 89
CPC ..... F04D 25/088; F04D 29/38; F04D 29/384; F04D 29/386; F21V 33/0096
See application file for complete search history.

(56) References Cited

U.S. PATENT DOCUMENTS

D414,857 S 10/1999 Zuege
D420,120 S 2/2000 Evans
D467,676 S * 12/2002 Packer ..... D26/72
D488,554 S 4/2004 Bacon et al.
D547,436 S 7/2007 Shurtleff
D549,813 S 8/2007 Gajewski
(Continued)

OTHER PUBLICATIONS http://www.homedepot.com/p/Hampton-Bay-Marlton-52-in-Indoor-Liquid-Nickel-Ceiling-Fan-YG305-LN/202529593, Hampton Bay, Marlton 52 in. Indoor Liquid Nickel Ceiling Fan, Model No. YG0305-LN, accessed Sep. 21, 2017.
(Continued)

*Primary Examiner* — Darlington Ly
(74) *Attorney, Agent, or Firm* — McGarry Bair PC

(57) CLAIM

The ornamental design for a ceiling fan motor housing and light kit combination, as shown and described.

DESCRIPTION

FIG. 1 is a top perspective view of a ceiling fan motor housing and light kit combination shown in the environment of a ceiling fan, showing our new design;
FIG. 2 is a bottom perspective view thereof;
FIG. 3 is a top plan view of the motor housing and light kit combination, having the ceiling fan environment removed;
FIG. 4 is a bottom plan view thereof;
FIG. 5 is a front [side] *elevation* view thereof; and,
FIG. 6 is a right side *elevation* view thereof.
Portions of the ceiling fan environment and the ceiling fan motor housing and light kit combination are shown in broken lines. Portions shown in broken lines form no part of the claimed design.

1 Claim, 6 Drawing Sheets

Figure 1:
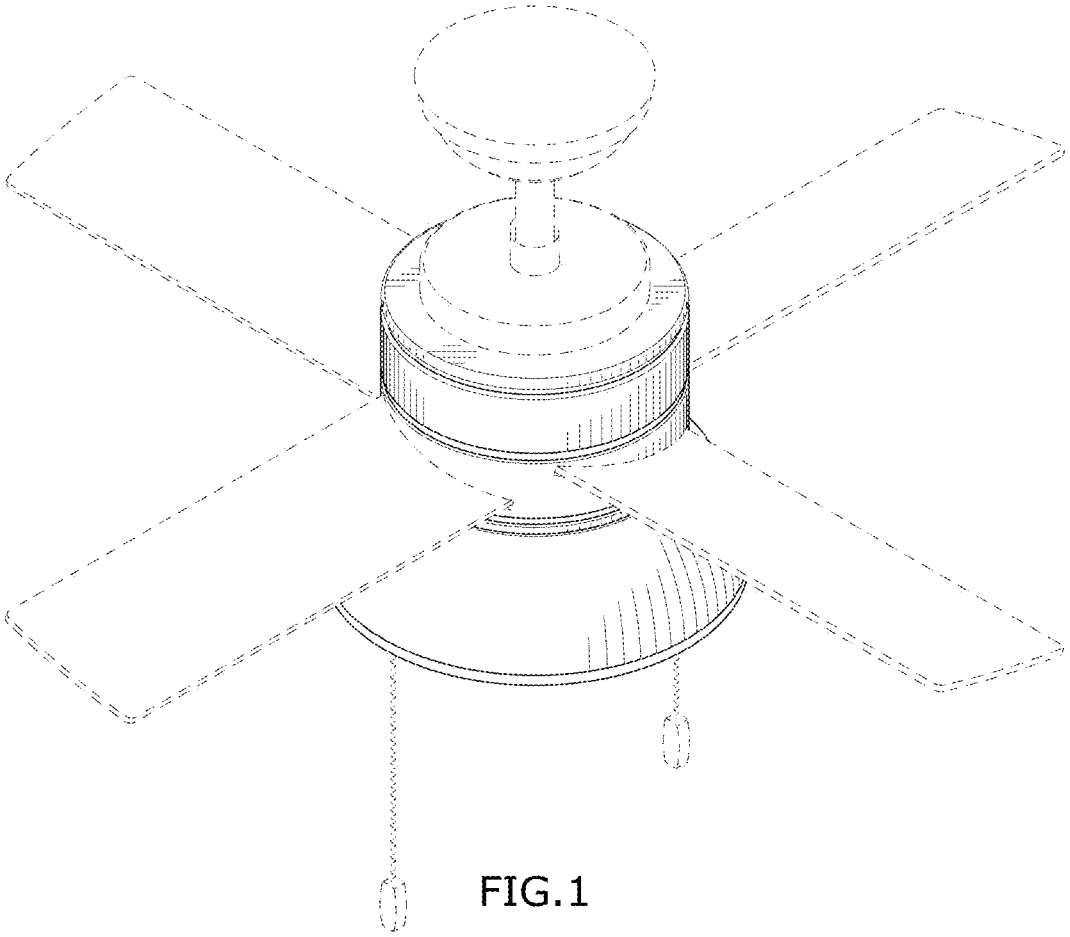
Figure 3:
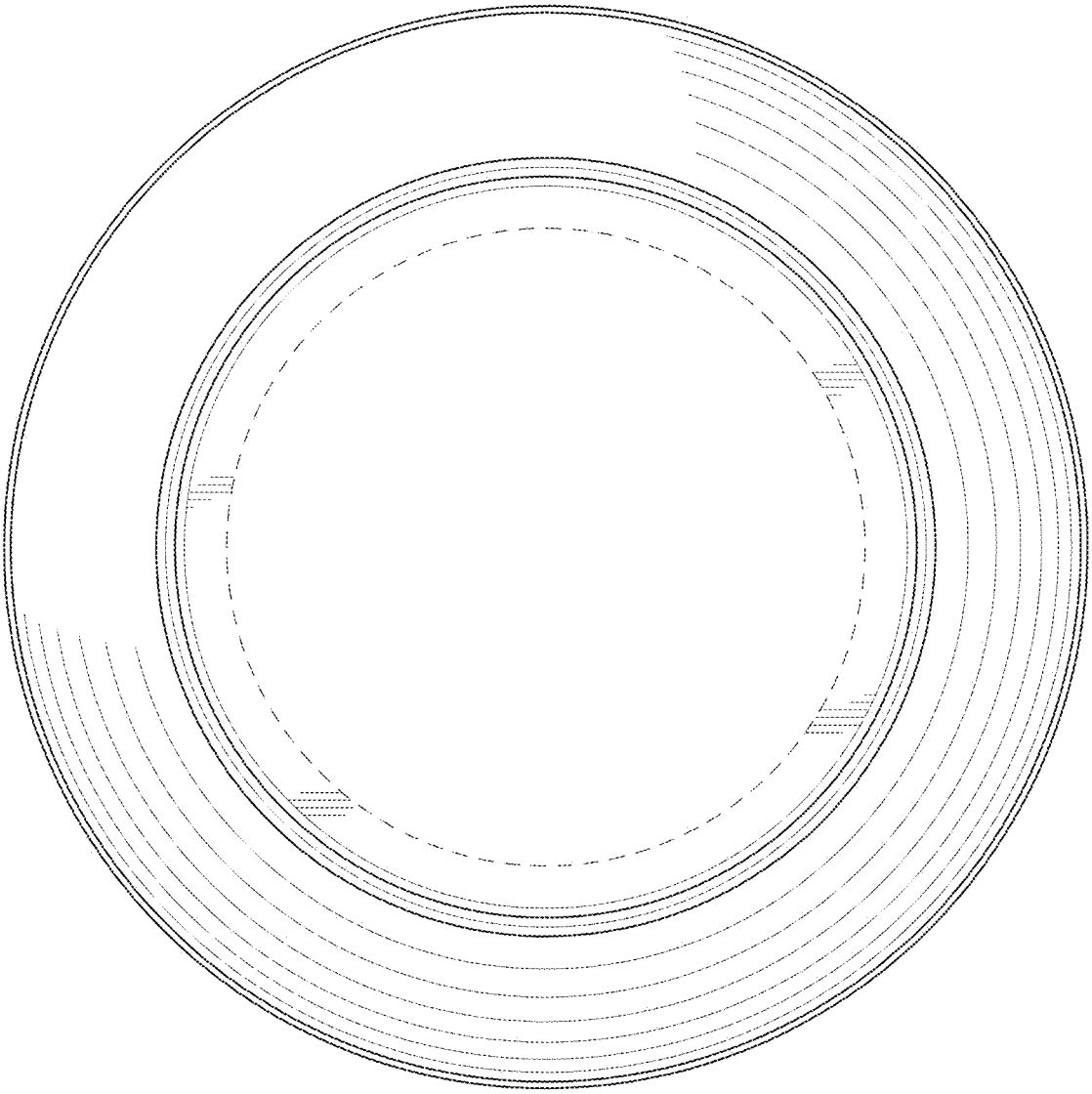
Figure 4:
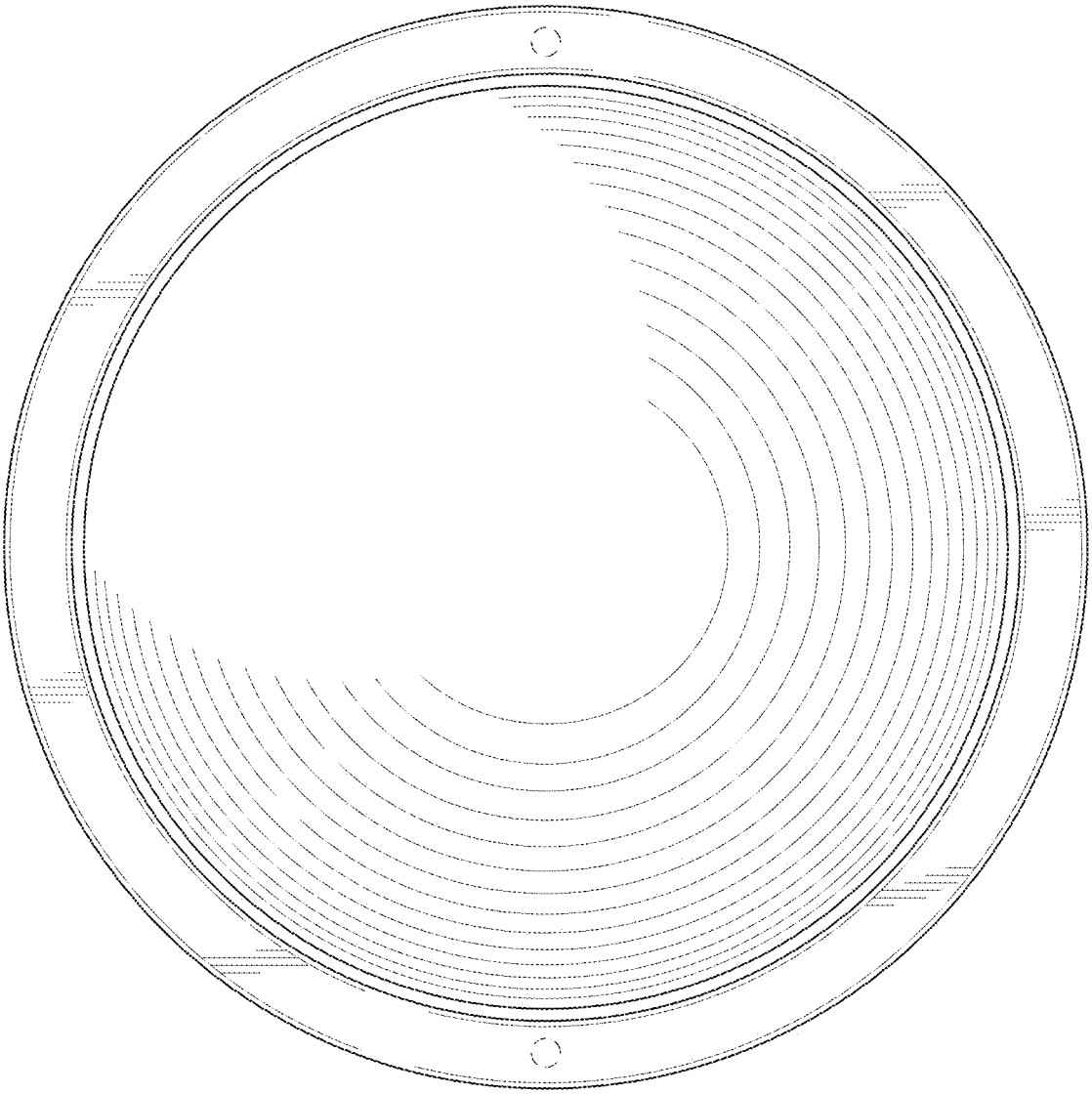
Figure 5:
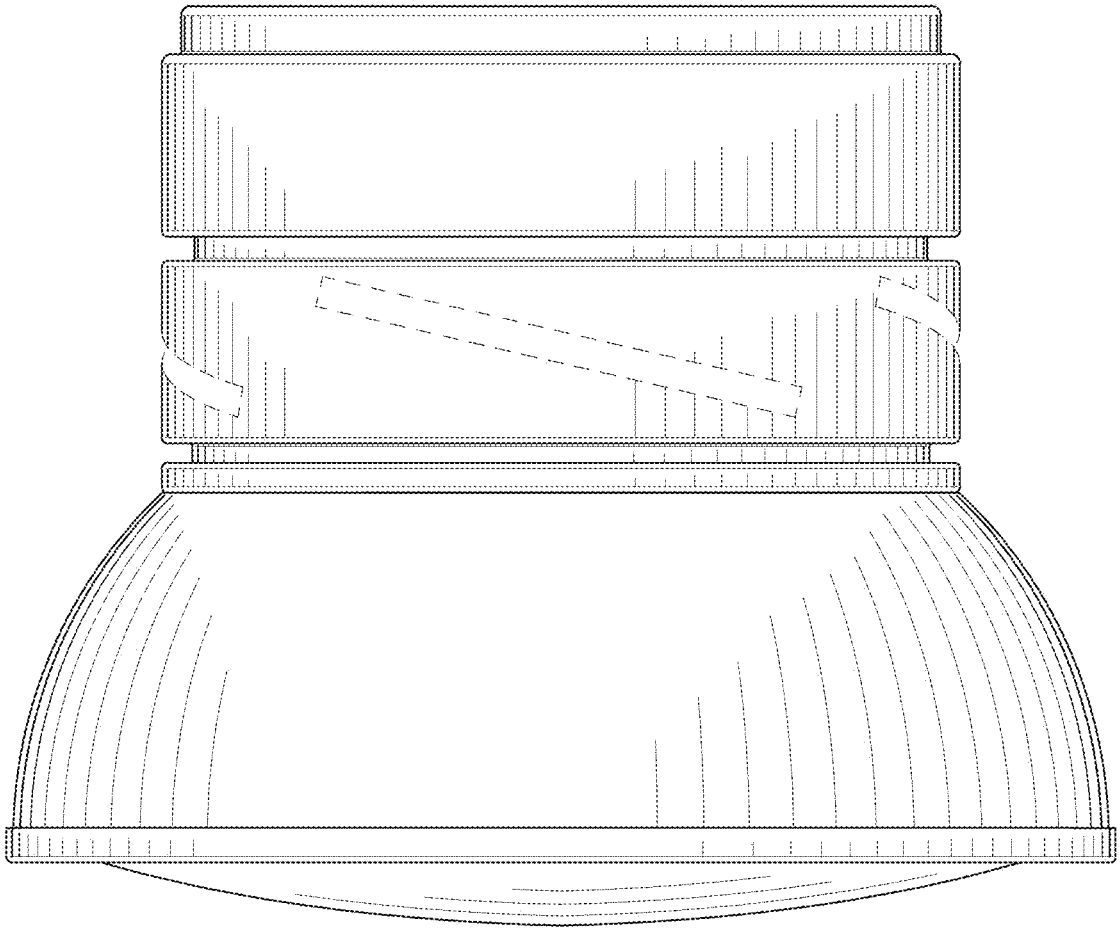
Figure 6:
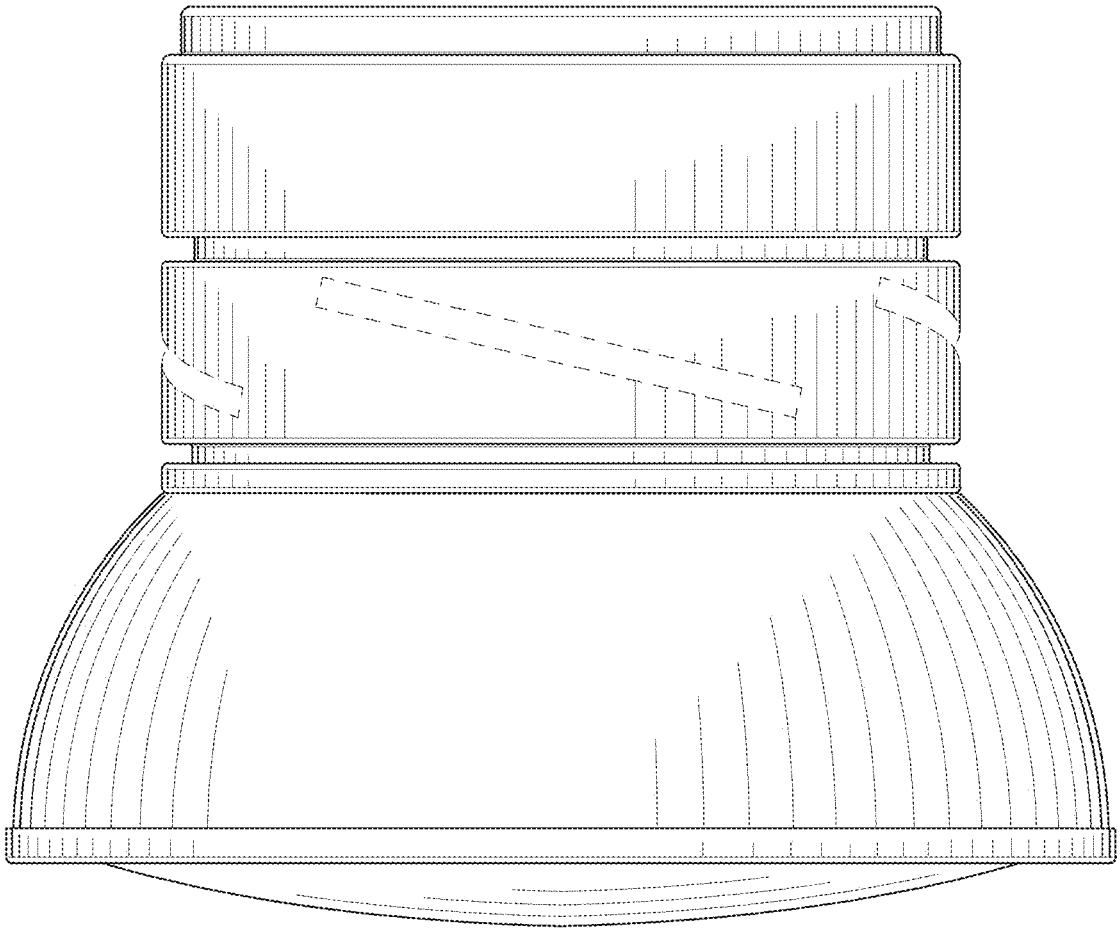

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D557,787 | S | | 12/2007 | Gajewski | |
| D567,988 | S | | 4/2008 | Lissoni | |
| D592,792 | S | | 5/2009 | Keller | |
| D599,459 | S | | 9/2009 | Hidalgo | |
| D632,381 | S | | 2/2011 | Davenport et al. | |
| D632,384 | S | | 2/2011 | Pan | |
| D632,412 | S | | 2/2011 | Pan | |
| D633,455 | S | | 3/2011 | Chiu | |
| D633,611 | S | | 3/2011 | Pan | |
| D704,821 | S | | 5/2014 | Wang | |
| D751,187 | S | | 3/2016 | Dolan | |
| D760,368 | S | | 6/2016 | Chen | |
| D783,145 | S | | 4/2017 | Wang | |
| D798,431 | S | | 9/2017 | McRoberts | |
| D800,289 | S | | 10/2017 | Guthrie | |
| D804,633 | S | | 12/2017 | Holmes | |
| D807,488 | S | | 1/2018 | McRoberts | |
| D810,919 | S | | 2/2018 | Haggar | |
| D826,395 | S | | 8/2018 | McRoberts et al. | |
| D827,123 | S | | 8/2018 | Guthrie | |
| D831,268 | S | | 10/2018 | Johnson | |
| D838,357 | S | | 1/2019 | Haggar | |
| D850,606 | S | | 6/2019 | Wang | |
| D854,677 | S | | 7/2019 | Haggar | |
| D877,316 | S | * | 3/2020 | Wang | D23/411 |
| D904,597 | S | * | 12/2020 | O'Connell | D26/59 |
| D917,685 | S | * | 4/2021 | Jung | D23/364 |
| D920,499 | S | * | 5/2021 | Holmes | D26/59 |
| D921,880 | S | * | 6/2021 | Haggar | D23/377 |
| D933,193 | S | * | 10/2021 | Haggar | D26/59 |
| D933,806 | S | * | 10/2021 | Haggar | D23/377 |
| D936,813 | S | * | 11/2021 | McRoberts | D23/377 |
| 11,162,501 | B1 | * | 11/2021 | Dewitt | F04D 29/646 |
| D939,133 | S | * | 12/2021 | McRoberts | D26/118 |
| D948,700 | S | * | 4/2022 | McRoberts | D26/59 |
| D969,302 | S | * | 11/2022 | Eiffert | D23/411 |
| D972,711 | S | * | 12/2022 | Holmes Bradley | D23/411 |
| D989,273 | S | * | 6/2023 | Haggar | D23/413 |
| D989,275 | S | * | 6/2023 | Haggar | D23/413 |
| D991,435 | S | * | 7/2023 | McRoberts | D23/411 |
| 2005/0214145 | A1 | | 9/2005 | Grinbergs | |
| 2021/0099048 | A1 | * | 4/2021 | Lin | H02K 5/26 |

OTHER PUBLICATIONS https://www.menards.com/main/lighting-ceiling-fans/ceiling-fans/indoor-ceiling-fans/turn-of-the-century-reg-alban-52-brushed-nickel-led-ceiling-fan/p-1473854532487-c-7488.htm?tid=8991733599029403053&ipos=12, Turn of the Century, Alban 52" Brushed Nickel LED Ceiling Fan, Model No. 20351, accessed Sep. 21, 2017.

http://www.minkagroup.net/products/f534l-wh, Minka Group, Lun-Aire 54" 5-Blade LED Ceiling Fan in White Finish with White Blades w/Etched Opal Glass, Model No. F534L-WH, accessed Sep. 21, 2017.

http://www.minkagroup.net/products/f683l-gi, Fanimation Xeno Ceiling Fan, Model No. FP6728, accessed Sep. 21, 2017.

https://www.menards.com/main/lighting-ceiling-fans/ceiling-fans/indoor-ceiling-fans/turn-of-the-century-reg-alban-52-brushed-nickel-led-celling-fan/p-147385433248-c-7488.htm?tid=8991733599029403053&ipos=12, Turn of the Century, Alban 52" Brushed Nickel LED Ceiling Fan, Model No. 20351, accessed Sep. 21, 2017.

http://www.montecarlofans.com/53867/57-Destin---Brushed-Steel-3DSTR57BSD.html, Monte Carlo Destin Collection, 57" Destin, Brushed Steel, Product No. 3DSTR57BSD, accessed Sep. 21, 2017.

http://www.homedepot.com/p/Hampton-Bay-Merope-52-in-Satin-Nickel-Indoor-Ceiling-Fan-HE-12027/203838990, Hampton Bay, Merope 52 in. Satin Nickel Indoor Ceiling Fan, Model No. HE-12027, accessed Sep. 21, 2017.

http://www.hunterfan.com/Ceiling-Fans/Clanton?ModelNumber=59202, Minka Group, Shade 45" 4-Blade LED Ceiling Fan in Grey Iron Finish with Matte Black Blades w/Clear Fresnel Glass, Model No. F683L-GI, accessed Sep. 21, 2017.

http://www.fanimation.com/products/index.php/fans/xeno.html, Hunter Fan, Clanton 52" Ceiling Fan in Brushed Steel Finish, Model No. 59202, accessed Sep. 21, 2017.

* cited by examiner

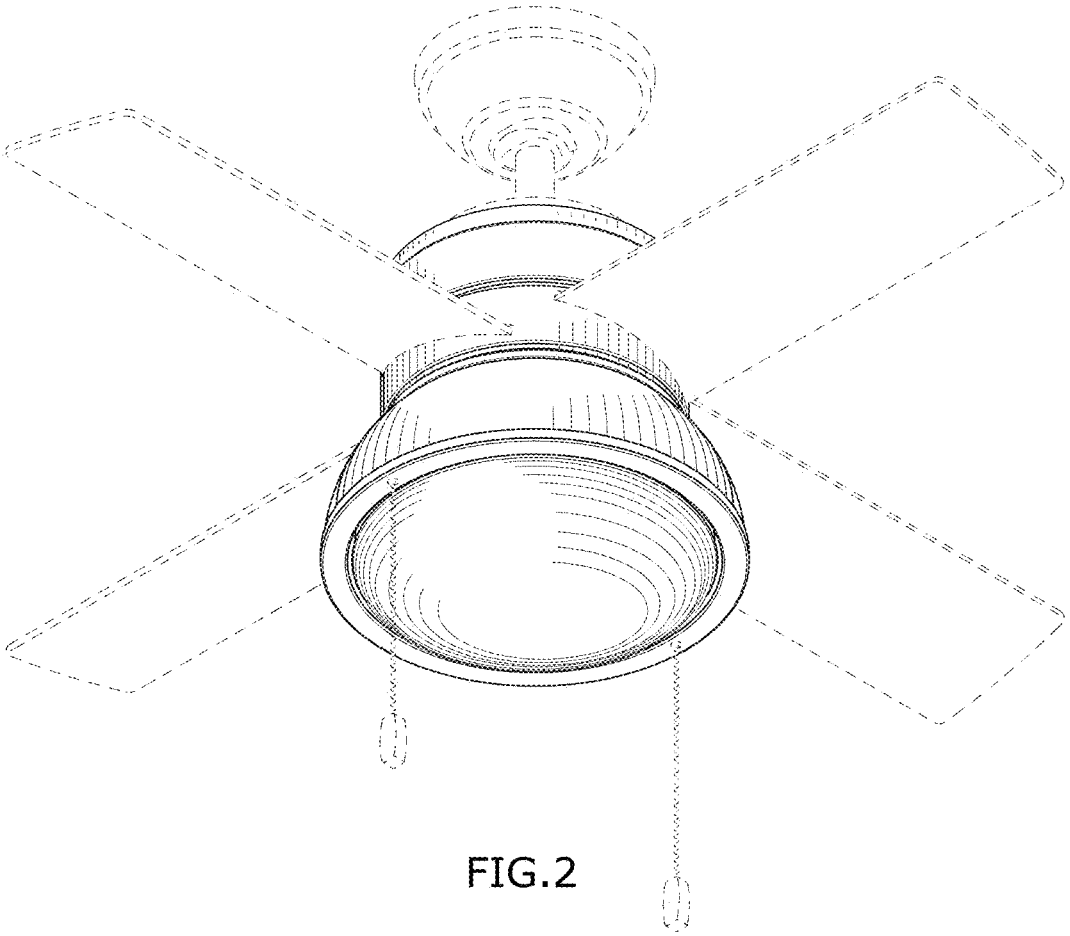
FIG.2
(AMENDED)